United States Patent [19]

Tampio

[11] Patent Number: 5,620,509

[45] Date of Patent: Apr. 15, 1997

[54] COATING COMPOSITION AND METHOD FOR ITS PREPARATION

[76] Inventor: Anna-Liisa Tampio, Kiviniementie 2 B 18, FIN-00960 Helsinki, Finland

[21] Appl. No.: 495,496

[22] PCT Filed: Jan. 26, 1994

[86] PCT No.: PCT/FI94/00035

§ 371 Date: Sep. 21, 1995

§ 102(e) Date: Sep. 21, 1995

[87] PCT Pub. No.: WO94/17147

PCT Pub. Date: Aug. 4, 1994

[30] Foreign Application Priority Data

Jan. 27, 1993 [FI] Finland .................................. 930326

[51] Int. Cl.$^6$ .................... C09D 101/02; C09D 101/26; C09D 101/28; C09D 103/02

[52] U.S. Cl. ................ 106/162.5; 106/162.51; 106/162.8; 106/162.81

[58] Field of Search .................. 106/197.1, 197.2, 106/203, 204, 162.5, 162.51, 162.8, 162.81

[56] References Cited

U.S. PATENT DOCUMENTS 4,994,509  2/1991  Laurent .................................. 524/35

FOREIGN PATENT DOCUMENTS 0165880  12/1985  European Pat. Off. .

*Primary Examiner*—David Brunsman
*Attorney, Agent, or Firm*—Marshall, O'Toole, Gerstein, Murray & Borun

[57] ABSTRACT

The object of the invention is a coating mixture for interior walls, which is applicable by spraying, which contains substantially finely divided cellulose fiber as a fiber, cellulose or starch based binder, water and foaming agent, wereby the mixture can contain also small amounts of additives or adjuvants, and the amount of binder calculated from the cellulose fiber is 3 to 15% by weight, and the dry matter content of the mixture is higher than appr. 12% by weight. The invention also relates to a method for the preparation and application of the coating mixture.

18 Claims, No Drawings

COATING COMPOSITION AND METHOD FOR ITS PREPARATION

The object of the invention is a coating mixture which contains cellulose fiber and binder in a mixture with water. The invention also relates to a method for the preparation and application of the coating mixture.

A great variety of sprayable wall coatings are known in the building industry. The use of cement as a binder is common to these solutions. The cement makes the finished coating resemble plaster, which i.a. for reasons of appearance considerably limits the use of the coating. Furthermore, the surface is hard and inelastic, and crumbles easily, and it does not stick to all building materials.

Coatings are also known, for example from the US-publication U.S. Pat. No. 4,994,509, which as a filler contain cellulose fibers together with a second, for example colouring filler component, such as quartz powder. However, the use of additional fillers, especially in large amounts, makes the aqueous coating mixture hard and difficult to handle, and it cannot be applied by spraying without problems.

The aim of the invention is to provide a sprayable mass containing natural fibers and binder, which may be used as a porous interior wall and ceiling coating in place of e.g. a sprayed plaster coating, conventional wall paper or the like. The object is thus to obtain a spreadable coating for such applications where also a sound absorbing coating is desired. In order to achieve this object, the filler component of the coating according to the invention consists of finely divided cellulose fibers, without mineral and other additional fillers. The coating composition according to the invention is thus characterized in that it contains finely divided cellulose fibers as a filler, water soluble cellulose and/or starch based binder, water, as well as foaming agent, and that the amount of binder calculated from the cellulose fibers is from 3 to 15% by weight, and the combined dry matter content of cellulose filler and binder of the mixture is higher than approximately 12% by weight.

By using, in the coating mixture, cellulose fibers, especially cotton fibers, as the only filler, a porous and easily finishable coating is obtained, which in addition has excellent sound dampening properties.

In the coating mixture according to the invention, the amount of binder calculated from the cellulose filler is from 3 to 15% by weight, especially from 3 to 11% by weight. The dry matter content of the filler and the binder in the mixture is advantageously higher than 15, such as 15 to 25, especially in the range of 15 to 20% by weight, as calculated from the whole mixture.

As the cellulose fiber, for example, finely divided cotton cellulose fibers may be used, which are commercially available in almost 100% pure form and bleached. Other suitable cellulose fiber products comprise wood cellulose fiber, flax cellulose fiber, as well as other possible cellulose fiber products of vegetable origin, as well as fiber products of regenerated cellulose, such as viscose.

As a binder both water soluble cellulose based binders, such as cellulose ethers, for example methylcellulose, hydroxypropyl- and hydroxyethylcellulose, and especially carboxymethylcellulose, CMC are suitable. Said cellulose derivatives are commercially available. A second binder class is formed by cold water soluble starches and starch derivatives.

The amount of binder to be used in the mixture according to the invention depends on the viscosity of the binder and on the desired adhesion, but the range mentioned above is generally suitable. CMC is commercially available, a suitable grade being for example Finnfix 300, manufacturer Metsä-Serla, wherein the CMC is in the form of the Na-salt of CMC.

The type of foaming agent to be used in the mixture is not critical, but per se known surface active agents may be used in the mixture, such as anion active, cation active and non-ionic surface active agents, i.e. tensides. Anion active tensides are i.a. alkylbenzene sulfonates, alkane sulfonates, fatty alcohol sulfates and fatty alcohol ether sulfates, advantageously long chain alkylsulfate salts, such as sodium laurylsulfate, and soaps. Non-ionic tensides are i.a. ethoxylated fatty alcohols, fatty amines, fatty acids and fatty acid esters, and aminoxides. The amount of foaming agent is such which gives a suitable foaming effect. The amount needed is usually small, and typically good results are obtained using amounts which are from about 0.001 to 1% by weight, advantageously 0.001 to 0.2 and especially 0.01 to 0.1% by weight calculated from the whole mixture.

Without the use of foaming agent, a problem is the presence of excess water in the mass as well as obtaining a homogenous mass. Without foaming agent, for one kilogram of dry matter about 9 to 11 liters of water are needed, whereas the said amount decreases to about half in the presence of foaming agent. The use of foaming agent thus accelerates the drying of the sprayed mass, the coating becomes porous and its coating capacity improves and the dried coating achieves a pleasant appearance. The foam producing surface active agent makes the mass airy and it is thus capable to take up more fibers forming a homogenous sprayable mass.

Although according to an advantageous embodiment of the invention the composition consists essentially only of a cellulose filler of the above type, a binder, water and foaming agent in the said amounts, according to the invention it is possible to use, in the composition, further adjuvants which typically are pigments, dye pastes and dye flakes, agents for improving moisture resistance and fire resisting agents. The total amount of these additional substances calculated from the whole mixture is relatively small, usually less than about 5%, often less than 3% by weight calculated from the whole mixture.

The coating according to the invention dampens sound reflection and can thus be used to improve the acoustical properties of a space. It has also heat insulating properties. The coating is non-toxic, odorless and breathing. It does not form an air-impenetrable film on the surface of the structure. When coating surfaces which already possess sound dampening properties, such as mineral wool boards or a wall made from light aggregate bricks without a finishing layer, their sound dampening properties only increase. When coating mineral wool boards a continuous seamless surface is obtained. When sprayed onto a hard surface, the coating corresponds to its sound dampening properties to a thick textile carpet.

The coating according to the invention functions, in addition to dampening the sound, also as a collector of water of condensation. In this case the mass to be sprayed should include also agents having an inhibitory effect on the formation of bacteria and moulds.

The coating can be made fire resistant by using fire resisting agents in the formulation. Thus a fire resisting agent in the form of a salt or salt solution, such as e.g. a nitrogen-phosphorus based solution (for example Amgard TR) is added to the mixture. The coating can be made completely fire proof, the ignitability classification being 1 and the flame spread classification being 1.

The moisture resistance of the coating may in turn be improved by adding resin to the mixture, or by substituting part of the binder for a suitable resin, such as acrylate or polyurethane dispersions. The colour of the naturally white coating may be changed by adding pigments or water soluble dye pastes, or various dye flakes. The natural yellowing of a white coating may be prevented by adding titan dioxide pigments at the preparation stage.

The mass is prepared by simply mixing the binder in water using efficient mixing. Thereafter the foaming agent and the fiber, while still mixing, for example at a rate of 100 rpm, and optional adjuvants are added.

The coating is rapidly and easily worked. The mixture is sprayed using a pump/spray combination which is capable of spraying a thick and airy mass. The structure of the surface may be varied by adjusting the sprayer pressure and the size of the nozzle. When an especially smooth surface is desired, the spraying is carried out twice. The second spraying is done onto the dried sprayed surface and smoothed with a spatula. The coating may also be applied directly using a spatula or a spatula may be used for filling irregularities in the support material (for example when repairing acoustical mineral wool boards). The coating does not require complicated priming work. By means of the coating according to the invention also curved supports such as pillars, vaulted ceilings and the like may be coated.

In the following the invention is described in more detail by means of the following examples and tests, which are not limiting to the invention.

EXAMPLE

A sprayable mass was prepared using the following recipe A):

| | | |
|---|---|---|
| 20 l | water | |
| 350 g | CMC | |
| 3.2 kg | bleached finely ground cotton cellulose | |
| 12 g | sodium laurylsulfate | |

The CMC was mixed with water and the foaming agent was added. The ground cotton cellulose was added while continously stirring.

The same procedure was repeated but using in place of the mentioned amounts of cellulose and CMC B) 150 g CMC and 3.8 kg of cellulose fibers, and correspondingly C) 360 g CMC and 4.2 kg of cellulose fibers.

The mixture according to the Example 1A) was sprayed on a support with a fiber coating spray device using a sufficient sprayer pressure. The fiber mass was sprayed onto different supports according to the table 1. In the sample 1, the spray support was concrete, in the sample 2 it was chip board, in the sample 3 it was gypsum board and in the sample 4 an acoustical wool board. Fracture strength was studied using a gypsum board sample (sample 5, table 2), in which an artificial fracture had been made by placing two gypsum boards with their edges against each other prior to coating. The test specimens were allowed to condition under standard conditions (23° C., 50% RH). Thereafter the adherence of the coating to the support was measured by pulling test bodies glued to the surface (diameter 28 mm) vertically upwards. The results of the test are given in table 1.

TABLE 1

Results from the adherence tests of the fiber coating

| Sample nr | Support | Test nr | Adhesion strength MPa | Break point |
|---|---|---|---|---|
| 1 | concrete | 1 | 0.19 | Border surface between coating and concrete |
| | | 2 | 0.20 | between coating |
| | | 3 | 0.21 | and concrete |
| | | 4 | 0.22 | Border surface between coating and concrete |
| | | 5 | 0.26 | Border surface between coating and concrete |
| | | mean | 0.2 | Border surface between coating and concrete |
| 2 | chip board | 1 | 0.24 | Border surface between coating and chipboard |
| | | 2 | 0.28 | between coating |
| | | 3 | 0.28 | and chipboard |
| | | 4 | 0.31 | Border surface between coating and chipboard |
| | | 5 | 0.29 | Border surface between coating and chipboard |
| | | mean | 0.3 | |
| 3 | gypsum board | 1 | 0.23 | Border surface between coating and gypsum board |
| | | 2 | 0.27 | between coating |
| | | 3 | 0.20 | and gypsum board |
| | | 4 | 0.23 | Border surface between coating and gypsum board |
| | | 5 | 0.23 | Border surface between coating and gypsum board |
| | | mean | 0.2 | |
| 4 | acoustical wool*) | 1 | 0.005 | the wool sheared |
| | | 2 | 0.006 | sheared |
| | | 3 | 0.007 | the wool sheared |
| | | 4 | 0.008 | the wool sheared |
| | | mean | 0.007 | |

*)As opposed to the other samples, the test body was square with a side length of l = 44 mm.

The fracture strength was tested with the sample 9. From the sample two test bodies with a width of appr. 50 mm were cut. The test bodies were pulled to fracture at a rate of 0.5 mm/min. The results are shown in the table 2.

TABLE 2

Results of pull tests

| Test sample | Tensile strength N/50 mm | The width of the fracture at the breaking of the coating, mm |
|---|---|---|
| 1 | 225 | 1 |
| 1 | 300 | 1 |

From the table 1 it may be seen that the coating has a good adherence to most supports. The best adherence 0.3 MPa was obtained to chipboard. From the result of the table 2 it is seen that the coating has a good fracture strength.

The absorption ratios of a board coated with a cotton fiber coating according to the invention have been determined using the ISO-standard 354-1985. The thickness of the coating was 4–6 mm and the board to coated either a 0.7 mm profile metal plate or a 13 mm gypsum board, or alternatively the thickness of the coating was 3–4 mm on a 50 mm acoustical board. Good absorption measurement results were obtained, for example a coating sprayed onto gypsum board corresponds to its sound attenuating properties to a thick textile carpet. When sprayed onto acoustical wool, the sound absorbing properties of the acoustical wool did not weaken but improved.

The invention is not limited to the afore mentioned embodiment but may be varied within the scope of the appended claims.

I claim:

1. A coating composition consisting essentially of a cellulose fiber filler, a water soluble binder comprising at least one of a cellulose material a starch material, water, a foaming agent, and optional adjuvants, wherein the amount of the binder based on the filler is 3 to 15% by weight, the dry-matter content of the filler and the binder of the composition is together approximately 12 to 25% by weight, and the amount of foaming agent is approximately 0.001 to 1% by weight.

2. The coating composition of claim 1, wherein the amount of binder based on the filler is 3 to 11% by weight, and the dry-matter content of the filler and the binder of the composition is higher than 15% by weight.

3. The coating composition of claim 1 or claim 2, wherein the cellulose fiber is cotton fiber.

4. The coating composition of claim 1 or claim 2, wherein the binder is a cellulose ether.

5. The coating composition of claim 4, wherein said binder is carboxymethylcellulose.

6. The coating composition of claim 1 or claim 2, wherein said composition contains a long chain alkylsulfate salt foaming agent.

7. The coating composition of claim 5, wherein the amount of said foaming agent is 0.01 to 0.1% by weight, based on the total composition.

8. The coating composition of claim 6, wherein said long chain alkylsulfate salt is sodium laurylsulfate.

9. The coating composition of claim 2, wherein said dry-matter content of the filler and the binder of the composition is 15 to 20% by weight.

10. The coating composition of claim 1, wherein the formulation comprises at least one material selected from the group consisting of fire resisting agents, pigments, dye pastes and flakes, moisture resisting agents, and mixtures thereof, the total amount of said agents being 5% by weight or less, based on the total composition.

11. The coating composition of claim 10, wherein the amount of said agents is 3% by weight or less, based on the total composition.

12. The coating composition of claim 1, consisting of approximately 10 to 20% by weight of said filler, approximately 0.5 to 2.5% by weight of said binder, approximately 0.005 to 0.2% by weight of said foaming agent, 0 to approximately 5% by weight of said further adjuvants, and the balance water.

13. The coating composition of claim 12, comprising a fire resisting agent.

14. The coating composition of claim 1, consisting of 12 to 18% by weight of said filler, 1.0 to 1.5% by weight of carboxymethylcellulose, 0.01 to 0.1% by weight of said foaming agent, and 0 to approximately 3% by weight of said further adjuvants, and the balance water.

15. The coating composition of claim 14, wherein the amount of cellulose fiber filler is approximately 16% by weight and the amount of carboxymethylcellulose is 1.5% by weight, based on the total composition.

16. The coating composition of claim 15, wherein said cellulose fibers are cotton cellulose fibers.

17. Method for the preparation of a coating composition, comprising the steps of mixing a cellulose fiber filler and a water soluble binder comprising at least one of a cellulose material and a starch material in water in the presence of a foaming agent, and optionally adding adjuvants, wherein the amount of the binder based on the filler is 3 to 15% weight, the dry-matter content of the filler, and the binder of the composition is together approximately 12 to 25% by weight, and the amount of foaming agent is approximately 0.001 to 1% by weight.

18. Method according to claim 17, wherein said binder is added to the water with stirring, and the foaming agent, the cellulose fiber filler and the optional adjuvants are thereafter added with stirring to form an airy homogeneous mass.

\* \* \* \* \*